E. O. HUTSELL.
PEA HARVESTER.
APPLICATION FILED FEB. 20, 1911.

1,028,072.

Patented May 28, 1912.
5 SHEETS—SHEET 2.

Ernest O. Hutsell,
INVENTOR

WITNESSES

BY

ATTORNEY

E. O. HUTSELL.
PEA HARVESTER.
APPLICATION FILED FEB. 20, 1911.

1,028,072.

Patented May 28, 1912.
5 SHEETS—SHEET 3.

Ernest O. Hutsell, INVENTOR

BY

ATTORNEY

WITNESSES

E. O. HUTSELL.
PEA HARVESTER.
APPLICATION FILED FEB. 20, 1911.

1,028,072.

Patented May 28, 1912.
5 SHEETS—SHEET 4.

WITNESSES

Ernest O. Hutsell, INVENTOR
BY
ATTORNEY

E. O. HUTSELL.
PEA HARVESTER.
APPLICATION FILED FEB. 20, 1911.

1,028,072.

Patented May 28, 1912.
5 SHEETS—SHEET 5.

Ernest O. Hutsell,
INVENTOR

WITNESSES
BY
ATTORNEY

UNITED STATES PATENT OFFICE.

ERNEST O. HUTSELL, OF ATHENS, TENNESSEE.

PEA-HARVESTER.

1,028,072.   Specification of Letters Patent.   Patented May 28, 1912.

Application filed February 20, 1911. Serial No. 609,682.

*To all whom it may concern:*

Be it known that I, ERNEST O. HUTSELL, a citizen of the United States, residing at Athens, in the county of McMinn and State of Tennessee, have invented a new and useful Pea-Harvester, of which the following is a specification.

The invention relates to improvements in pea harvesters.

The object of the present invention is to improve the construction of pea harvesters, and to provide a simple and comparatively inexpensive pea harvesting machine, adapted to gather peas from a plurality of rows of vines and deliver the harvested peas to a hulling machine, or other receptacle, and equipped with mechanism, capable of cutting the vines into short lengths to prevent long vines from being drawn into the machine and clogging the same.

A further object of the invention is to enable the harvesting mechanism to be adjusted vertically to arrange the same at the proper elevation to suit the height of the peas or other vines, and also to enable such mechanism to clear obstructions and to be elevated out of the way when it is desired to transfer the machine from one field or place to another.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings.

Like numerals of reference designate corresponding parts in all the figures of the drawings.

In the accompanying drawings in which is illustrated the preferred embodiment of the invention, 1 designates a wheeled main frame, provided with a suitable casing 2 and having front and rear platforms 3 and 4. The main frame is supported at its rear portion by traction wheels 5, located between the sides of the casing and mounted on a rotary rear axle 6. The rear axle is journaled in suitable bearings of the main frame, and the traction wheels 5 are provided at the inner ends of their hubs with clutch faces 7, coöperating with similar clutch faces of slidable clutch sections 8, mounted on the rear axle and slidably interlocked with the same by a key and yieldably maintained in engagement with the clutch faces of the traction wheels by coiled springs 9.

The coiled springs 9, which are disposed on the rear axle, are interposed between the sliding clutch sections and set collars 10, adjustably fixed to the rear axle by clamping screws 11. When the machine moves forwardly, the traction wheels actuate the rear axle and motion is communicated to the mechanism hereinafter described, but when the machine is moved rearwardly or is backed in turning, the coiled springs 9 will permit the clutch faces of the traction wheels to slide over the clutch faces of the sections 8 without rotating the rear axle.

The tongue 12 is connected with the hounds 13 of a front truck, which supports the front of the main frame. The front truck is equipped with an axle 14, pivoted by a king bolt 15 and having suitable wheels 16 mounted on its spindles. The hounds are connected at their rear ends by a cross bar 17, beneath which passes a reach bar 18, extending from the front of the casing to the center of the front truck. The front platform is equipped with a seat 19 for the accommodation of the driver or operator.

The rear axle is connected with a lower transverse drive shaft 20 by spur gears 21 and 22. The gear wheel 21, which is loose on the rear axle, is provided at one end of its hub with a clutch face 23, and the other end of its hub has an annular groove 24, forming a terminal flange or head 25, which is arranged in a sectional bearing 26, suitably clamped to the rear axle. The clutch face 23 of the gear wheel 21 is engaged by a movable clutch section 27, slidably interlocked with the rear axle by a key or spline 28 and having an annular groove 29 to receive the forked end 30 of a horizontal link 31 of the shifting mechanism for moving the slidable clutch section 27 into and out of engagement with the clutch face of the gear wheel to throw the mechanism of the harvesting machine into and out of operation. The link 31, which extends longitudinally of the rear axle, is located above the same and its inner end 30 is bent downwardly to extend it into the groove of the slidable clutch section. The outer end of the link 31 is connected to the lower end of a short upright lever 32, fulcrumed at an intermediate point on a bracket 33 and connected at its upper end by a link 34 with a shifting lever 35. The supporting bracket 33 consists of an arm, extending inwardly from one side of the frame of the machine and provided at its outer end with an attaching plate or portion. The link 34 extends through the side of the casing, and the operating or shifting lever 35 is located exteriorly of the casing and is equipped with a dog or detent 36, controlled by a latch lever 37 and arranged to engage inner and outer notches 38 of a plate 39, whereby the slidable clutch section is locked in and out of engagement with the clutch face of the gear wheel 21.

Figure 1:
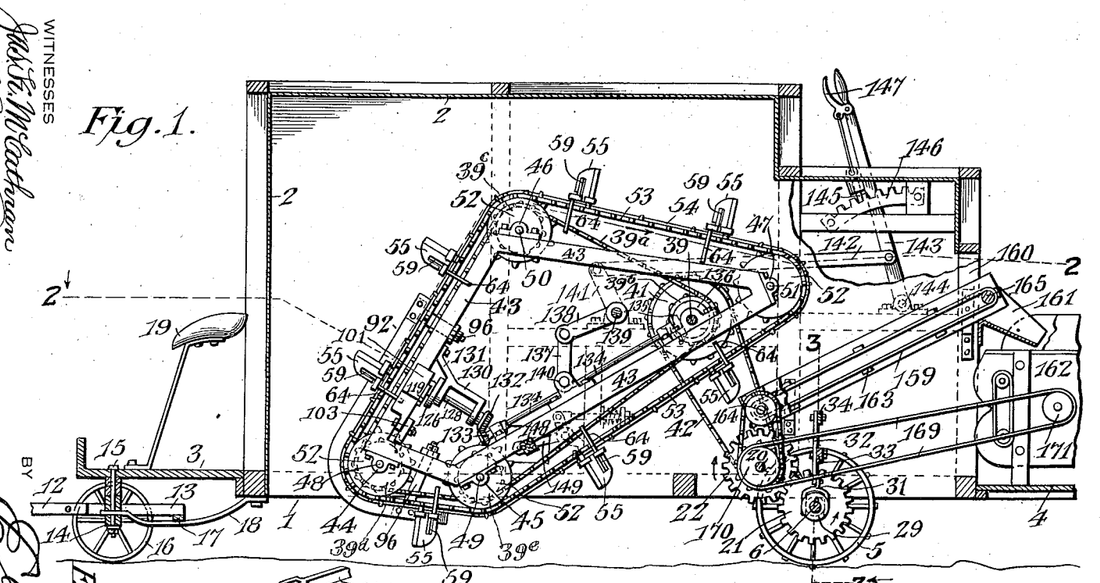
—Figure 1 is a longitudinal sectional view of a pea harvesting machine, constructed in accordance with this invention.
Figure 2:
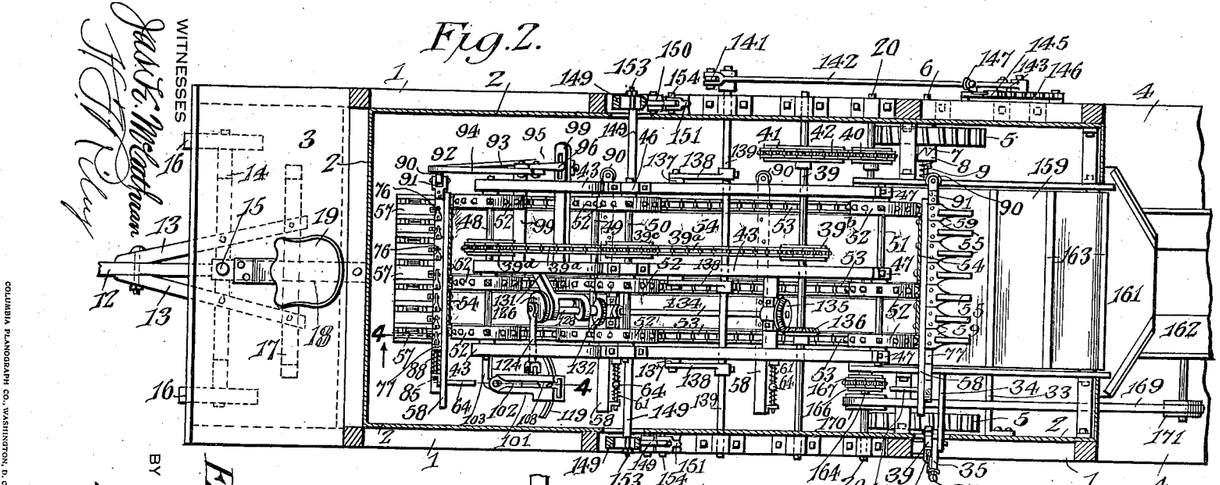
Fig. 2 is a horizontal sectional view, taken substantially on the line 2—2 of Fig. 1.
Figure 3:
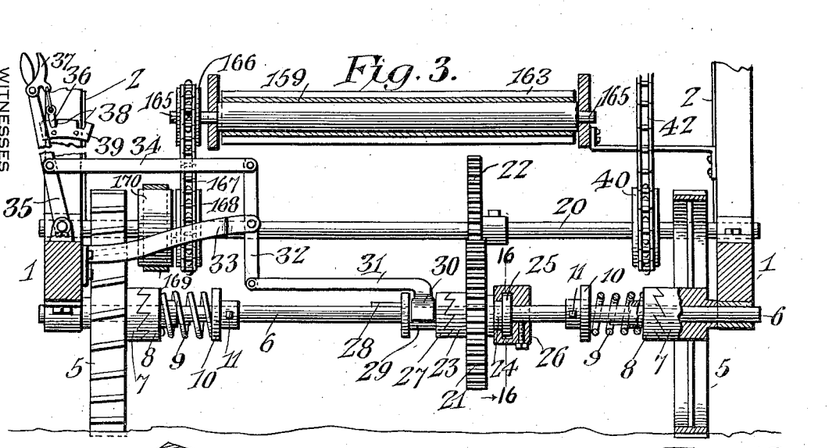
Fig. 3 is a transverse sectional view on the line 3—3 of Fig. 1.

The gear wheel 22 is suitably fixed to the drive shaft, which is rotated in the direction of the arrow in Fig. 1 of the drawing. The drive shaft 20 is connected with an upper transverse shaft 39 by sprocket gearing comprising a lower sprocket pinion 40, an upper sprocket wheel 41 and a sprocket chain 42. The upper transverse shaft 39 is journaled in suitable bearings of the main frame of the machine, and it forms a pivot for a vertically adjustable frame 43 upon which the harvesting mechanism is mounted.

The pivoted vertically adjustable frame, which is open at the sides, as clearly shown in Fig. 1, is oppositely tapered in side elevation, and it is provided with spaced front and rear lower bearings 44 and 45 and spaced upper front and rear bearings 46 and 47. The upper front bearings are located above and slightly in rear of the lower front bearings, and the upper rear bearings are located above and considerably in rear of the lower rear bearings. These bearings receive transverse shafts 48, 49, 50 and 51, upon which are mounted sprocket wheels 52 for a plurality of spaced longitudinal endless sprocket chains 53, extending around and carried by the pivoted vertically adjustable frame, and carrying an apron 54 to form an endless carrier for conveying the harvested material rearwardly from the front of the machine to the back thereof.

The endless carrier, which travels in the direction of the arrow in Fig. 1 of the drawings, consists of a rear downwardly and forwardly moving flight, a relatively short bottom forwardly moving flight, an upwardly moving inclined front flight, and a rearwardly moving top flight, arranged at a slight inclination and extending downwardly and rearwardly from the top of the front flight. Motion is communicated to the endless carrier from the transverse pivot shaft of the adjustable frame by sprocket gearing consisting of a sprocket chain 39$^a$ and sprocket wheels 39$^b$, 39$^c$, 39$^d$ and 39$^e$, mounted, respectively, on the pivot shaft and on the front upper shaft 50 and the lower front and rear shafts 48 and 49.

The endless carrier is equipped at regular intervals with stripping and cutting mechanisms, extending transversely of the machine and being of a length preferably to operate on a plurality of rows of vines, and each comprising spaced guards or fingers 55, a reciprocatory cutter or sickle bar 56, and hinged blades 57, arranged to close over the spaces between the fingers or guards.

In practice peas are usually planted in rows two and a half feet apart, and it will be advantageous to employ cutting and stripping devices about seven feet, which will be of a length sufficient to operate on three rows of vines. Any other desired length of cutting and stripping mechanisms may of course be employed. The inner ends of the fingers or guards are secured to a transverse bar 58, which is suitably fastened to links of the endless carrier chains, and the said guards or fingers project outwardly at right angles to the plane of the links to which the transverse bar 58 is secured. The cutter or sickle bar is equipped with knives 59, suitably secured to the cutter or sickle bar and operating in slots 60 of the guards or fingers. The knives 59 of the cutter or sickle bar are centered or maintained beneath the fingers or guards by a pair of coiled springs 61, mounted on a rod or stem 62, supported in a bracket 63 and extending through and forming a guide for a pin 64 of the sickle or cutter bar.

The sickle or cutter bar is provided at one end with a head 65, and the pin 64, which projects from the head, is provided with a transverse perforation 66 through which the rod or stem 62 passes. The springs 61 engage the opposite sides of the pin and center the latter with respect to the bracket after each operation of the cutter or sickle bar by the mechanism hereinafter described. The knives of the cutter or sickle bar are centered or arranged beneath the fingers or guards in order to maintain the spaces between the same clear for the passage of the vines.

Figures 4, 5, 8, 9:
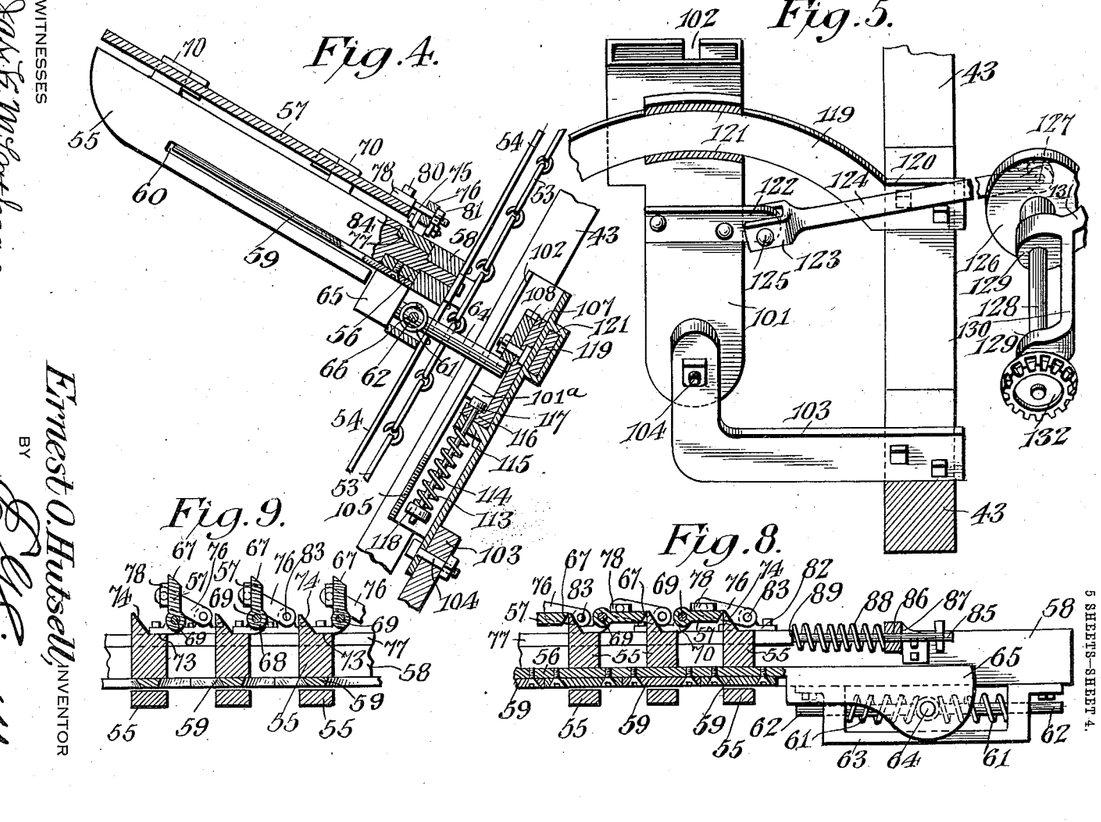
Fig. 4 is an enlarged detail sectional view on the line 4—4 of Fig. 2.
Fig. 5 is an enlarged detail sectional view, illustrating the manner of mounting the oscillatory casing and the means for guiding and actuating the same.
Fig. 8 is a transverse sectional view on the line 8—8 of Fig. 6, the hinged blades being closed.
Fig. 9 is a similar view, the hinged blades being open.
Figure 6:
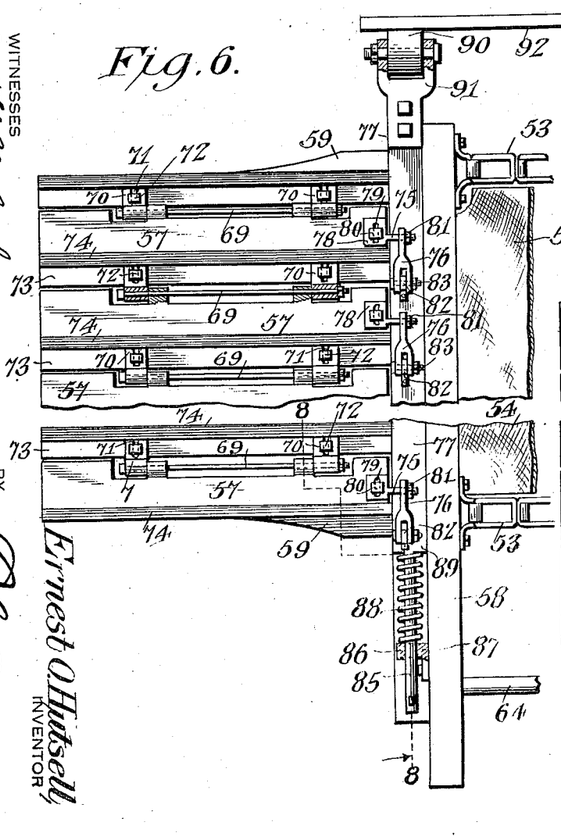
Fig. 6 is an enlarged plan view, partly in section, of one of the harvesting mechanisms.
Figure 7:
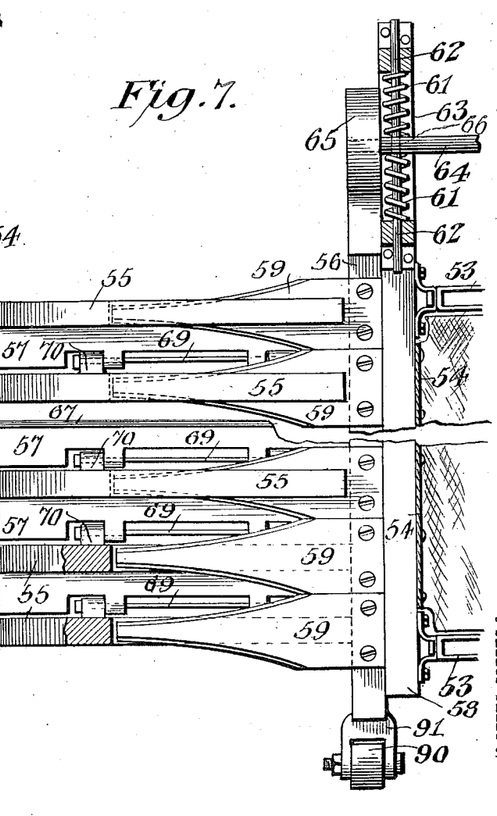
Fig. 7 is a reverse plan view of the same, partly in section.
Figure 10:
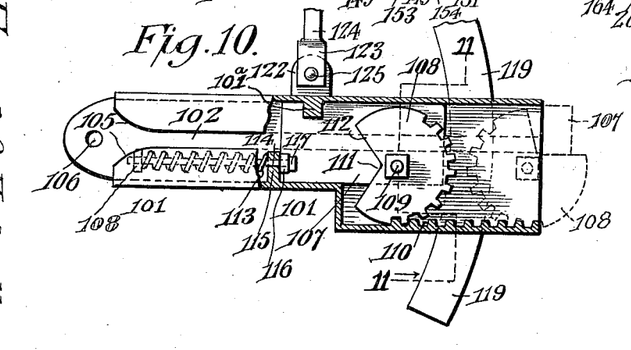
Fig. 10 is a longitudinal sectional view of the oscillatory device for actuating the cutter or sickle bar of the harvesting mechanism.
Figure 11:
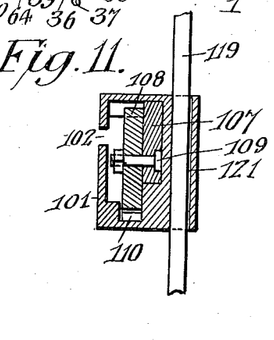
Fig. 11 is a transverse sectional view of the same on the line 11—11 of Fig. 10.
Figure 12:
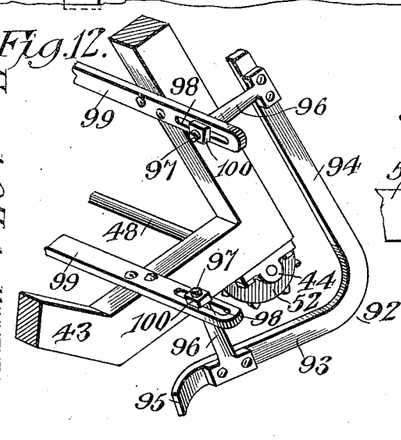
Fig. 12 is an enlarged detail perspective view of the actuating guide for operating the hinged blades.
Figure 13:
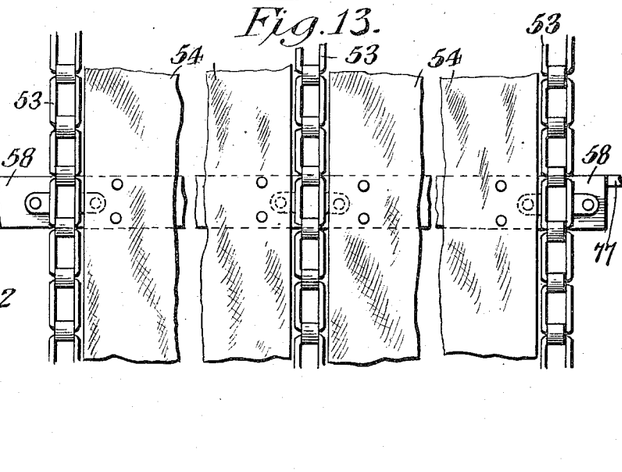
Fig. 13 is an enlarged detail view of a portion of the endless carrier on which the harvesting mechanism is mounted.
Figure 14:
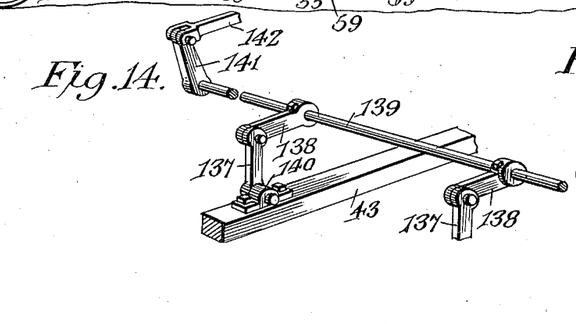
Fig. 14 is a detail view of a portion of the rock shaft, which is connected with the pivotally mounted vertically adjustable frame.
Figure 15:
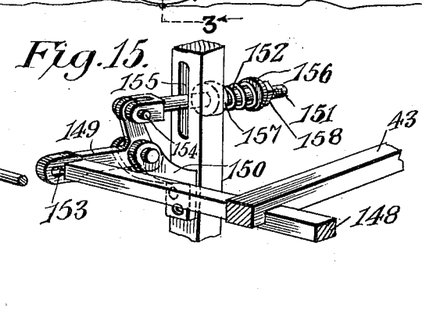
Fig. 15 is a detail perspective view of one of the yieldable supporting devices.
Figure 16:
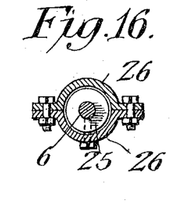
Fig. 16 is a detail sectional view on the line 16—16 of Fig. 3.

The guards or fingers are carried forward in an inverted position by the rear and bottom flights of the endless carrier, and while passing beneath the bottom of the pivoted frame, they are engaged with the vines and as they are carried upwardly and rearwardly by the front inclined flight of the endless carrier, they operate to strip the pods from the vines. The blades 57 are provided at one side with a beveled cutting edge 67, and they are equipped at the opposite edge with eyes 68 for the reception of pintles 69, and they are adjustably connected by leaves or hinge elements 70 with the guards or fingers. The hinge elements or leaves 70 are provided with slots 71 and are secured by set screws 72 to flat upper faces 73 of the guards or fingers 55. By adjusting the hinge elements of the blades 57, the latter may be caused to close over the spaces between the guards or fingers to a greater or less extent, and the adjustment is adapted to take up the wear and enable the cutting edges of the blades to coöperate properly with the cutting edges of approximately triangular ribs 74, extending longitudinally of the upper faces of the guards or fingers at one side thereof, the flat faces 73 being located at the opposite side thereof, as clearly illustrated in Figs. 8 and 9 of the drawings. The hinged blades close after the vines enter the spaces between the guards or fingers, and when they close on the vines, they coöperate with the tapered or triangular ribs of the guards or fingers to strip the pods from the vines, and the harvested material is carried upward by the stripping and the cutting mechanism, the blades closing the spaces between the guards or fingers sufficient to prevent the pods from passing through the same.

The inner ends of the hinged blades are equipped with inwardly or rearwardly projecting pivots 75, connected by links 76 with a transverse reciprocatable bar 77 and formed integral with attaching plates 78, provided with slots 79 and adjustably secured to the upper or outer faces of the hinged blades by set screws 80. The attaching plates 78 are adjustable transversely of the hinged blades to position the pivots properly with relation to the links, and the latter are provided with perforations to receive the pivots 75, which are threaded at their rear terminals for the reception of nuts 81, but any other suitable fastening means may be employed for this purpose. The links 76 are bifurcated to straddle ears 82 of the reciprocatory bar 77, and they are pivoted to the ears by bolts 83 or other suitable fastening means. The transverse reciprocatable bar 77 is mounted in upper alined recesses 84 of the guards or fingers, and it is provided at one end with a reduced portion or stem 85, extending through a guide opening 86 of a bracket 87 and supporting a coiled spring 88, interposed between the bracket 87 and a shoulder 89, formed by the reduction of the bar 77 to provide the stem. The bracket 87 is secured to the transverse bar 58, and the spring operates to open the hinged blades 57 automatically when the reciprocatable bar 77 is free to move.

The reciprocatable bar 77 is equipped at its other end with an anti-friction device, preferably consisting of a roller 90, mounted in a bifurcated head 91 and arranged to engage an actuating guide 92. The guide 92, which consists of a track or bar, is approximately L-shaped and is mounted at the lower front portion of the adjustable frame at one side thereof in spaced relation with the same, and it is composed of a lower approximately horizontal arm or portion 93, and an upwardly extending inclined arm or portion 94. The terminal 95 of the bottom portion 93 of the guide 92 is curved outwardly to enable the roller 90 to readily engage the same, and the bottom arm or portion of the guide extends forwardly and inwardly from the outwardly curved terminal 95, in order to gradually move the reciprocatable bar 77 inward as it approaches the front of the pivoted frame. The hinged blades are closed on the vines by the guide as the guards or fingers are carried upward by the front stretch of the endless carrier, and they are maintained in such closed position by the upper inclined arm or portion 94 of the guide. This produces a stripping action of the mechanism, and the pods are stripped off the vines and fall upon the guards or fingers and are carried upward by the same, the spaces between the guards or fingers being closed to the passage of the pods, as before explained. As the guards or fingers are arranged in an inclined position while they are being carried upward by the said front flight, the harvested material falls back upon the apron of the carrier, so that it is not necessary to extend the inclined portion 94 of the guide to the top of the frame, but it may be so extended to prevent the opening of the hinged blades until they reach the top rearwardly moving flight of the endless carrier. As soon as the roller 90 leaves the guide, the spring 88 actuates the transverse bar 77 and opens the hinged blades automatically. The guide is supported by suitable brackets 96 consisting of stems provided at one end with attaching plates or portions, which are secured to the outer side face of the guide. The other end 97 of the stems is reduced to pass through slots 98 of the supporting bars 99, and are threaded for the reception of nuts 100. The supporting bars project laterally from the pivoted frame, and the brackets are adjustably clamped to the said bars 99 by the nuts 100, the slots permitting an inward and outward adjustment of the guide to arrange it in position for properly actuating the reciprocatory bar 77 in the closing movement of the hinged blades.

The stripping and cutting devices, which may be arranged at any suitable intervals, are preferably placed about ten inches apart, and in order to prevent long vines from being drawn into the machine and clogging the same, the cutter or sickle bar is reciprocated by a continuously operating oscillatory device, consisting of an inclined casing 101, arranged in the path of the pin 64 and provided with a longitudinal slot or way 102, through which the pin 64 passes, whereby the sickle or cutter bar is actuated during the passage of the pin through the casing. The casing, which is approximately oblong, is pivoted at its lower end to a suitable bracket 103 by a bolt 104, and the mouth or entrance 105 of the slot or way 102 is flared, and as the pin 64 enters the slot or way at the pivoted end of the casing, the movement of the sickle or cutter bar is gradual, the stroke lengthening as the pin moves upwardly in the casing. The reciprocation of cutter or sickle bar severs the vines, which are acted on by the succeeding stripping and cutting devices. The bolt 104 passes through a perforation 106 in the lower end of the casing, and the bracket 103, which is approximately L-shaped, is secured to the supporting frame and extends laterally from the side thereof opposite that at which the guide 92 is located.

In order to prevent the pin 64 from being struck by the oscillating device as it leaves the upper end of the casing, the latter is equipped with a longitudinally movable slide 107, suitably guided by the walls of the casing and located beneath the slot or guide 102 and carrying a mutilated pinion 108, mounted on a suitable pivot 109 and having a plurality of teeth, which mesh with a rack 110. The casing 101 is provided with a guiding lug 101ª, which overhangs the slide 107. The rack 110 extends longitudinally of the casing, and the teeth are preferably formed integral with one of the side walls thereof. The pinion is provided with a recess 111, forming a shoulder 112, which is engaged by the pin 64. The pinion is rotated by the pin during the movement of the same through the casing until the shoulder 112 is brought into alinement with the slot or groove 102. This movement also extends the slide 107 beyond the upper end of the casing, and as soon as the pin is released by the pinion, the slide is quickly returned to its initial position within the casing by a coiled spring 113. The spring 113 is mounted on a rod 114, extending through a relatively fixed lug 115 of the casing and through a lug or flange 116 of the slide. The lug 115 is preferably formed integral with the bottom and side walls of the casing, and is located at a point intermediate of the ends thereof, and the lug 116 is arranged at the inner or lower end of the slide. The rod is provided at its upper end with a head 117 to fit against the lug 116, and its lower end is provided with a suitable stop 118, preferably consisting of a disk and forming a bearing for the lower end of the coiled spring, which is compressed when the slide is moved upwardly or outwardly. The spring 113 and the means for mounting the same are located at one side of the slot or way of the oscillatory casing and beyond the path of the pin 64 of the cutter or sickle bar.

The oscillatory casing is guided in its pivotal movement by a curved guide bar 119, extending laterally from the adjacent side of the adjustable frame and having an inner attaching portion 120, which is secured to the same. The oscillatory casing is provided at its upper portion with an arcuate opening 121 of the same curvature as the guide, and snugly fitting the same, whereby the pivoted casing is slidably connected with the guide 119, as clearly illustrated in Fig. 5 of the drawings. This insures a steady positive reciprocation of the cutter or sickle bar.

The oscillatory casing is provided at its inner side with a laterally extending ear 122, formed by an extension of a bar or piece, which is secured to the lower face of the oscillatory casing. The ear 122 is pivoted in a bifurcation 123 of a pitman 124 by a pin 125. The bifurcation 123 is located at the outer end of the pitman, which extends inwardly from the oscillatory casing to a crank element 126, preferably consisting of a crank disk or wheel having a wrist pin 127 to which the inner end of the pitman 124 is connected. The crank disk is fixed to the upper end of a short inclined shaft 128, mounted in spaced bearings 129 of a bracket 130, which is provided at the upper portion with an attaching arm 131, secured to the front portion of the adjustable frame. The lower end of the short inclined shaft 128 carries a bevel pinion 132, meshing with a similar bevel pinion 133 of an inclined longitudinal shaft 134, mounted in suitable bearings upon the bottom rear portion of the adjustable frame and extending from the short front inclined shaft 128 to the upper transverse pivot shaft 39 and connected with the same by bevel gears 135 and 136, mounted, respectively, on the shafts 134 and 39. The vibratory casing is continuously operated during the operation of the endless carrier upon which the stripping and cutting devices are mounted.

The bottom portion of the pivoted frame of the endless carrier is connected by links 137 with a plurality of forwardly extending arms 138 of a transverse rock shaft 139. The rock shaft, which extends across the main frame and through the pivoted frame, is journaled in suitable bearings of the sides of the main frame, and the links 137, which extend upwardly from the bottom portion of the pivoted frame, are pivoted at their lower ends to ears 140, having attaching plates suitably secured to the pivoted frame of the endless carrier. The forwardly extending arms are located within the casing of the main frame and the transverse rock shaft 139 extends through one side of the said casing and is provided with an upwardly extending arm 141, which is connected by a rod 142 with an operating lever 143. The operating lever, which is arranged in an upright position at one side of the frame of the machine, is pivoted at its lower end 144, and it is equipped with a dog or detent 145, arranged to engage a toothed segment 146 and controlled by a latch lever 147, mounted on the adjusting lever at the upper handle portion thereof.

In order to enable the pivoted frame and the mechanism carried by the same to be easily adjusted, the harvesting machine is equipped at opposite sides with yieldable supporting devices, which are connected with the ends of a transverse bar 148. Each of the yieldable supporting devices comprises a bell crank lever 149, fulcrumed at its angle in a bracket 150, and having one arm extended forwardly and connected to the bar 148, and the other arm of the bell crank lever extends upwardly and is connected with a rod 151 upon which a coiled spring 152 is mounted. The transverse bar 148 is provided at each end with a pivot 153, which is arranged in the opening of the forwardly extending arm of the bell crank lever, and the rod 151 is bifurcated at its front end to receive the upwardly extending arm of the bell crank lever, and is pivoted to the same by a pin 154. The rod 151 extends through a slot 155 of the main frame, and the spring 152, which is disposed on the rod, bears against an adjustable washer or plate 156 of the rod, and a washer or plate 157 is fitted against the frame and through which the rod 151 passes. The rear end of the rod 151 is threaded for the reception of a nut 158, which adjusts the washer 156 to control the tension of the spring 152. The coiled spring 152 at opposite sides of the harvesting machine takes care of a portion of the weight of the pivoted frame, and it renders the adjustment thereof easier No claim is made in the present application to the device for partially counter-balancing the weight of the pivoted frame.

The material drops from the endless carrier onto an inclined endless conveyer 159, which carries the cut vines and peas through an opening 160 in the rear wall of the casing of the main frame and delivers them to a chute 161, located above a pea huller 162, which is mounted on the rear platform 4. The inclined endless conveyer consists of an apron, provided at intervals with slats 163 and mounted on front and rear transverse shafts 164 and 165. The front shaft 164 carries a sprocket wheel 166, which is connected by a sprocket chain 167 with a sprocket wheel 168 of the drive shaft, whereby motion is communicated therefrom to the inclined conveyer. The pea huller 162 is driven by a belt 169, extending from a pulley 170 of the drive shaft to a pulley 171 of the pea huller.

Instead of delivering the peas to the pea huller, a suitable receptacle may be arranged on the rear platform, or a wagon may be driven near the chute for such purpose.

Having thus fully described my invention, what I claim as new and desire to secure by Letters Patent, is:—

1. A harvesting machine of the class described including an endless carrier, and stripping mechanism mounted on the carrier and comprising a series of spaced fingers projecting from the carrier and arranged to receive the vines between them, blades movably mounted on the fingers and extending longitudinally of and arranged to close over the spaces between the same for gripping the vines between them and the said fingers, and means for operating the blades to open and close the same.

2. A harvesting machine of the class described including an endless carrier and stripping mechanism mounted on the carrier and comprising a series of spaced fingers projecting from the carrier and arranged to receive the vines between them, blades hinged to the fingers and extending longitudinally thereof and arranged to close over the spaces between the fingers for gripping the vines between them and the said fingers, and means for opening and closing the blades.

3. A harvesting machine of the class described including an endless carrier, and stripping mechanism mounted on the carrier and comprising spaced fingers provided with cutting edges, blades hinged to the fingers and extending longitudinally thereof and arranged to close over the spaces between the fingers to coöperate with the cutting edges thereof for gripping the vines, and means for opening and closing the blades.

4. A harvesting machine of the class described including an endless carrier, and stripping mechanism mounted on the carrier and comprising spaced fingers provided with flat upper faces and having tapered longitudinal ribs at one side of the same to form cutting edges, blades extending longitudinally of the fingers and hinged to the flat faces thereof and arranged to close over the spaces between the fingers and coöperating with the ribs to grip the vines, and means for operating the fingers.

5. A harvesting machine of the class described including an endless carrier, and stripping mechanism mounted on the carrier and comprising spaced fingers, hinged blades extending longitudinally of the fingers and arranged to close over the spaces between the same, a reciprocatory bar connected with the blades, and means for actuating the bar for opening and closing the blades.

6. A harvesting machine of the class described including an endless carrier, and stripping mechanism mounted on the carrier and comprising spaced fingers, hinged blades extending longitudinally of the fingers and arranged to close over the spaces between the same, a reciprocatory bar connected with the blades, a spring for moving the bar in one direction, and relatively fixed means arranged in the path of the bar for moving the same in the opposite direction.

7. A harvesting machine of the class described including an endless carrier, and stripping mechanism mounted on the carrier and comprising spaced fingers, hinged blades extending longitudinally of the fingers and arranged to close over the spaces between the same, a reciprocatory bar connected with the blades, a spring connected with the bar and arranged to move the same to open the blades, and a relatively fixed guide arranged in the path of the bar for actuating the same to close the blades.

8. A harvesting machine of the class described including an endless carrier, and stripping mechanism mounted on the carrier and comprising spaced fingers, hinged blades extending longitudinally of the fingers and arranged to close over the spaces between the same, a reciprocatory bar connected with the blades, a spring connected with the bar and arranged to move the same to open the blades, and a relatively fixed guide located in the path of the reciprocatory bar and having a portion arranged to close the blades and another portion arranged to maintain the blades in a closed position during a portion of the travel of the stripping mechanism.

9. A harvesting machine of the class described including an endless carrier having a forwardly moving flight and an upwardly moving front flight, stripping mechanism mounted on the carrier and comprising spaced fingers, hinged blades mounted on the fingers and arranged to close over the spaces between the same, a reciprocatory bar connected with the blades, and a guide arranged in the path of the reciprocatory bar and consisting of a bottom portion spaced from the bottom flight of the carrier and arranged to close the blades, and an upright portion extending from the front of the bottom portion and arranged to maintain the blades in a closed position.

10. A harvesting machine of the class described including an endless carrier having a forwardly moving flight and an upwardly moving front flight, stripping mechanism mounted on the carrier and comprising spaced fingers, hinged blades mounted on the fingers and arranged to close over the spaces between the same, a reciprocatory bar connected with the blades, and an approximately L-shaped guide consisting of a bottom portion having a curved terminal and arranged at an angle to the bottom flight of the conveyer for gradually moving the reciprocatory bar to close the blades, and an upwardly extending portion arranged to maintain the blades in their closed position.

11. A harvesting machine of the class described including an adjustable frame, an endless carrier supported by the frame, and stripping mechanism including spaced fingers mounted on the endless carrier, hinged blades extending longitudinally of the fingers, a reciprocatory bar arranged transversely of the fingers, a guide arranged in the path of the bar for actuating the same, brackets secured to the guide, supporting bars mounted on the adjustable frame and having slots receiving the brackets, and means for adjusting the brackets in the slots of the supporting bar.

12. A harvesting machine of the class described including an endless carrier, spaced fingers mounted on the carrier, hinged blades extending longitudinally of the fingers and arranged to close over the spaces between the same, a transversely disposed reciprocatory bar, pivots projecting from the inner ends of the blades, links connecting the pivots with the said bar, and means for automatically actuating the reciprocatory bar.

13. A harvesting machine of the class described including an endless carrier, spaced fingers mounted on the carrier, a reciprocatory sickle bar coöperating with the fingers, and means located in the path of the sickle bar for actuating the same during a portion of the travel of the said sickle bar.

14. A harvesting machine of the class described including an endless carrier, spaced fingers mounted on the carrier and provided with slots, a sickle bar having knives operating in the slots of the fingers, a continuously operated vibrating device arranged in the path of the sickle bar, and means carried by the sickle bar for engaging with the said device, whereby the sickle bar is reciprocated during a portion of its travel.

15. A harvesting machine of the class described including an endless carrier, spaced fingers mounted on the carrier and provided with slots, a sickle bar having knives operating in the slots of the fingers, a continuously operated vibrating device arranged in the path of the sickle bar, and means connected with the sickle bar for automatically centering the knives thereof with respect to the fingers when the sickle bar disengages the said device.

16. A harvesting machine of the class described including an endless carrier, spaced fingers mounted on the carrier, a reciprocatory sickle bar having knives to coöperate with the fingers and provided with projecting pins, springs located at opposite sides of the pins for centering the knives with respect to the fingers, and means located in the path of the pins for reciprocating the sickle bar during a portion of the travel of the same.

17. A harvesting machine of the class described including an endless carrier, spaced fingers mounted on the carrier, a reciprocatory sickle bar having knives to coöperate with the fingers and provided with projecting pins, a bracket, a guide rod mounted in the bracket and supporting the pins, springs mounted on the guide rod and located at opposite sides of the pins and arranged to actuate the same to center the knives with respect to the fingers, and means engageable with the pins for reciprocating the sickle bar during a portion of the travel thereof.

18. A harvesting machine of the class described including an endless carrier, spaced fingers mounted on the carrier, a reciprocatory sickle bar having knives to coöperate with the fingers and provided with projecting pins, a bracket, a guide rod mounted in the bracket and supporting the pins, springs mounted on the guide rod and located at opposite sides of the pins and arranged to actuate the same to center the knives with respect to the fingers, a vibratory device having a guide arranged to receive the pins and adapted to reciprocate the sickle bar during the travel of the pins through the said guide.

19. A harvesting machine of the class described including an endless carrier, a series of spaced fingers mounted on the endless carrier, a reciprocatory sickle bar having knives to co-act with the fingers and provided with a projecting pin, a pivotally mounted oscillatory device having a guide and arranged in the path of the pin, and means for vibrating the said device to reciprocate the sickle bar during the passage of the pin through the said guide.

20. A harvesting machine of the class described including an endless carrier, spaced fingers mounted on the carrier, a sickle bar having knives to co-act with the fingers, a pivotally mounted vibratory device arranged in the path of the sickle bar and adapted to actuate the same during a portion of the travel of the said sickle bar, an arcuate guide receiving and supporting the said device, and mechanism connected with the vibratory device for actuating the same.

21. A harvesting machine of the class described including an endless carrier, spaced fingers mounted on the carrier, a slidable bar having knives to co-act with the fingers, a pivotally mounted vibratory device arranged in the path of the sickle bar and adapted to actuate the same during a portion of the travel of the said sickle bar, a crank element, a pitman connecting the crank element with the vibratory device, and means for rotating the crank element for actuating the said device.

22. A harvesting machine of the class described including a main frame, an adjustable frame, a pivot shaft mounted on the main frame and connecting the adjustable frame therewith, an endless carrier supported by the adjustable frame, spaced fingers mounted on the endless carrier, a sickle bar co-acting with the fingers, a vibratory device arranged in the path of the sickle bar for reciprocating the same, a crank element, a pitman connecting the crank element with the said device, and gearing for communicating motion from the pivot shaft to the crank element.

23. A harvesting machine of the class described including a main frame, an adjustable frame, a pivot shaft mounted on the main frame and connecting the adjustable frame therewith, an endless carrier supported by the adjustable frame, spaced fingers mounted on the endless carrier, a sickle bar co-acting with the fingers, a vibratory device arranged in the path of the sickle bar for reciprocating the same, a relatively short crank shaft having a crank element and arranged at the front of the adjustable frame, a pitman connecting the crank element with the said device, a longitudinal shaft extending from the crank shaft to the pivot shaft, and gears connecting the said shafts with each other for communicating motion from the pivot shaft to the crank element.

24. A harvesting machine of the class described including an endless carrier, a series of spaced fingers mounted on the endless carrier, a reciprocatory sickle bar co-acting with the fingers and having a projecting pin, a pivoted oscillatory device arranged in the path of the pin and having a guide for the same, means for actuating the said device, extensible means mounted on said device and actuated by the pin to project the extensible means from the said device, and a spring for automatically returning the extensible means to its initial position.

25. A harvesting machine of the class described including an endless carrier, a series of spaced fingers mounted on the endless carrier, a reciprocatory sickle bar co-acting with the fingers and having a projecting pin, an oscillatory casing arranged in the path of the pin and provided with a guide for the same, a slide mounted within the casing and arranged to project therefrom, a spring for returning the slide to its initial position within the casing, and means actuated by the pin for moving the slide to its extended position.

26. A harvesting machine of the class described including an endless carrier, a series of spaced fingers mounted on the endless carrier, a reciprocatory sickle bar co-acting with the fingers and having a projecting pin, an oscillatory casing arranged in the path of the pin and provided with a guide for the same, a slide mounted within the casing and arranged to project therefrom, a spring for raising the slide to its initial position within the casing, and means composed of a fixed rack, and a pinion mounted on the slide and meshing with the rack and arranged to be engaged by the pin for moving the slide to its extended position.

27. A harvesting machine of the class described including an endless carrier, a series of spaced fingers mounted on the carrier, a reciprocatory sickle bar co-acting with the fingers and having a projecting pin, an oscillatory casing having a guide or way for the passage of the pin therethrough, said casing being also provided with a rack, a slide mounted within the casing, a pinion carried by the slide and meshing with the rack and arranged in the path of the pin and rotated by the same for moving the slide to an extended position, and means for returning the slide to its initial position when the pin disengages the pinion.

28. A harvesting machine of the class described including an endless carrier, a series of spaced fingers mounted on the carrier, a reciprocatory sickle bar co-acting with the fingers and having a projecting pin, an oscillatory casing having a guide or way for the passage of the pin therethrough, said casing being also provided with a rack, a slide mounted within the casing, a pinion mounted on the slide and meshing with the rack and provided with a recess arranged to receive the pin, said pinion being actuated by the pin for moving the slide to an extended position, and a spring connected with the slide for raising the same to its initial position.

29. A harvesting machine of the class described including an endless carrier, spaced fingers mounted on the carrier, pivoted blades extending along the fingers and closable over the spaces between the same for gripping the vines, a reciprocatory sickle bar co-acting with the fingers, mechanism for closing the blades during a portion of the travel of the fingers, and means for reciprocating the sickle bar while the vines are gripped by the blades.

30. A harvesting machine of the class described including an endless carrier, spaced fingers mounted on the carrier, pivoted blades extending longitudinally of the fingers and closable over the spaces between the same to grip the vines, a reciprocatory sickle bar having knives co-acting with the fingers, means for automatically centering the knives with respect to the fingers for maintaining the spaces between the same normally clear, means for actuating the blades to grip the vines, and mechanism for reciprocating the sickle bar while the vines are held by the said blades.

31. A harvesting machine of the class described including an endless carrier composed of spaced chains, cutting and stripping devices mounted on the chains and extending across the carrier at regular intervals, an apron extending across the spaces between the said devices, and means located in the path of the stripping and cutting devices for actuating the same during a portion of their travel.

32. A harvesting machine of the class described including an endless carrier, stripping and cutting devices arranged at intervals on the carrier and each comprising spaced fingers, pivotally mounted blades disposed longitudinally of the fingers and co-acting with the same to grip the vines, a reciprocatory bar connected with the blades, a reciprocatory cutter bar having knives co-operating with the fingers, and means located at opposite sides of the carrier and arranged in the path of the reciprocatory bar for actuating the same.

33. A harvesting machine of the class described including an endless carrier, stripping and cutting devices arranged at intervals on the carrier and each comprising spaced fingers, pivotally mounted blades disposed longitudinally of the fingers and co-acting with the same to grip the vines, a reciprocatory bar connected with the blades, a reciprocatory cutter bar having knives cooperating with the fingers, a guide located at one side of the carrier and arranged in the path of the reciprocatory bar for actuating the same to close the blades on the vines and to maintain the blades in engagement with the vines, and means located at the opposite side of the endless carrier and arranged to reciprocate the sickle bar while the vines are gripped by the blades.

34. A harvesting machine of the class described including an endless carrier, stripping and cutting devices arranged at intervals on the carrier and each comprising spaced fingers, pivotally mounted blades disposed longitudinally of the fingers and co-acting with the same to grip the vines, a reciprocatory bar connected with the blades, a reciprocatory cutter bar having knives coöperating with the fingers, a fixed guide located at one side of the carrier and arranged in the path of the reciprocatory bar for closing the blades on the vines and for maintaining the blades in engagement with the vines, and a vibratory device located at the opposite side of the carrier and arranged in the path of and adapted to actuate the sickle bar while the vines are being gripped by the blades.

35. A harvesting machine of the class described including an endless carrier, stripping and cutting devices arranged at intervals on the carrier and each comprising spaced fingers, pivotally mounted blades disposed longitudinally of the fingers and co-acting with the same to grip the vines, a reciprocatory bar connected with the blades, a reciprocatory cutter bar having knives cooperating with the fingers, a fixed guide located at one side of the carrier and arranged in the path of the reciprocatory bar for closing the blades on the vines and for maintaining the blades in engagement with the vines, a vibratory device located at the opposite side of the carrier and arranged in the path of and adapted to actuate the sickle bar while the vines are being gripped by the blades, and gearing connected with the vibratory device for continuously actuating the same.

In testimony, that I claim the foregoing as my own, I have hereto affixed my signature in the presence of two witnesses.

ERNEST O. HUTSELL.

Witnesses:
E. L. Roberts,
W. N. Knox.

---

Copies of this patent may be obtained for five cents each, by addressing the "Commissioner of Patents, Washington, D. C."